United States Patent
Dube et al.

(10) Patent No.: US 7,474,631 B2
(45) Date of Patent: Jan. 6, 2009

(54) ON-DEMAND GROUP COMMUNICATION SERVICES WITH QUALITY OF SERVICE (QOS) GUARANTEES

(75) Inventors: Parijat Dube, Hickaville, NY (US); Zhen Liu, Tarrytown, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 11/034,702

(22) Filed: Jan. 13, 2005

(65) Prior Publication Data

US 2006/0153100 A1 Jul. 13, 2006

(51) Int. Cl.
*H04J 1/16* (2006.01)
*H04L 12/56* (2006.01)

(52) U.S. Cl. .................. 370/254; 370/252; 709/238

(58) Field of Classification Search .............. 370/237, 370/238, 252, 256, 254; 709/238–242
See application file for complete search history.

(56) References Cited

U.S. PATENT DOCUMENTS

| | | | |
|---|---|---|---|
| 6,373,406 B2 | 4/2002 | Luby | |
| 2005/0015511 A1* | 1/2005 | Izmailov et al. | 709/238 |
| 2005/0111387 A1 | 5/2005 | Francois et al. | |

OTHER PUBLICATIONS

Y.-H. Chu, S. G. Rao, and H. Zhang, "A Case for End System Multicast," in Proc. of ACM Sigmetrics, Jun. 2000.
S. Shi and J. S. Turner, "Multicast Routing and Bandwidth Dimensioning in Overlay Networks," IEEE Journal on Selected Areas in Communication, 2002.
N. Malouch, Z. Liu, D. Rubenstein, S. Sahu, "A Graph Theoretic Approach to Bounding Delay in Proxy-Assisted End-System Multicast," in Proc. of Tenth International Workshop on Quality of Service (IWQOS 2002).
Y. Chawathe, S. McCanne and E.A. Brewer, "RMX: Reliable Multicast Using Overlay," in Proc. of ACM Sigmetrics, 2003.
Y. Chu, S. Rao, S. Sheshan, H. Zhang, "Enabling Conferencing Applications on the Internet Using an Overlay Multicast Architecture," in Proc. of ACM Sigcomm, Aug. 2001.
S. Banerjee, C. Kommareddy, K. Kar, B. Bhattacharjee, S. Khuller, "Construction of an Efficient Overlay Multicast Infrastructure for Real-Time Applications," in Proc. of IEEE Infocom 2003.
J. Liebeherr; M. Nahas, "Application-Layer Multicast with Delaunay Triangulations," IEEE Journal on Selected Areas in Communication, 2003.
International Search Report for International Application No. PCT/EP2005/055852, Feb. 23, 2006.

* cited by examiner

*Primary Examiner*—John Pezzlo
(74) *Attorney, Agent, or Firm*—Ference & Associates LLC

(57) ABSTRACT

The present invention broadly contemplates addressing QoS concerns in overlay design to account for the last mile problem. In accordance with the present invention, a simple queuing network model for bandwidth usage in the last-mile bottlenecks is used to capture the effects of the asymmetry, the contention for bandwidth on the outgoing link, and to provide characterization of network throughput and latency. Using this characterization computationally inexpensive heuristics are preferably used for organizing end-systems into a multicast overlay which meets specified latency and packet loss bounds, given a specific packet arrival process.

15 Claims, 4 Drawing Sheets

The feasible set for a given load and population N is the intersection of loss feasible and delay feasible regions.

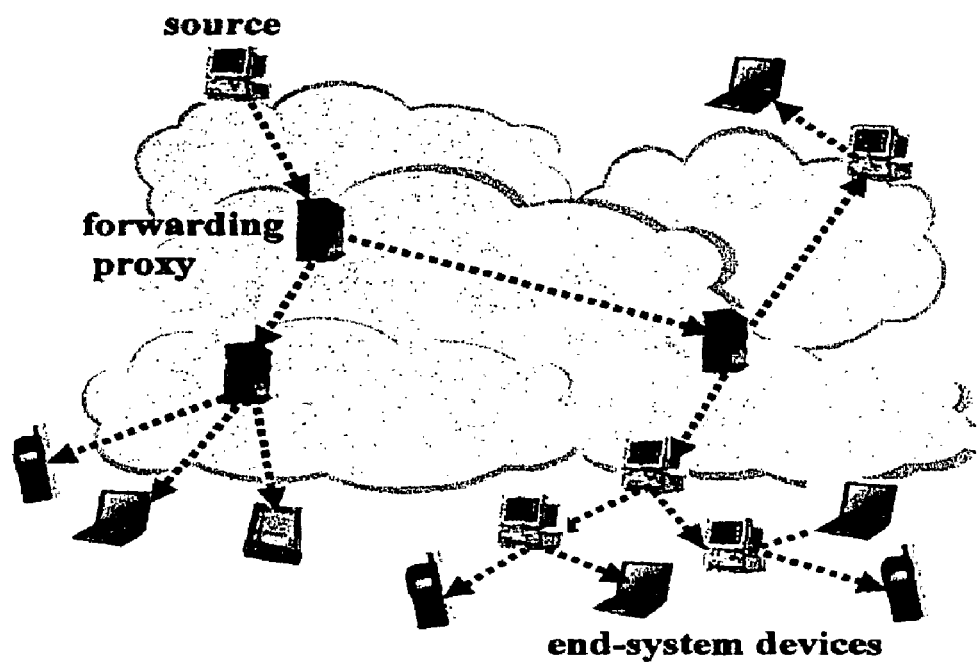
Figure 1 Overlay Architecture Illustration

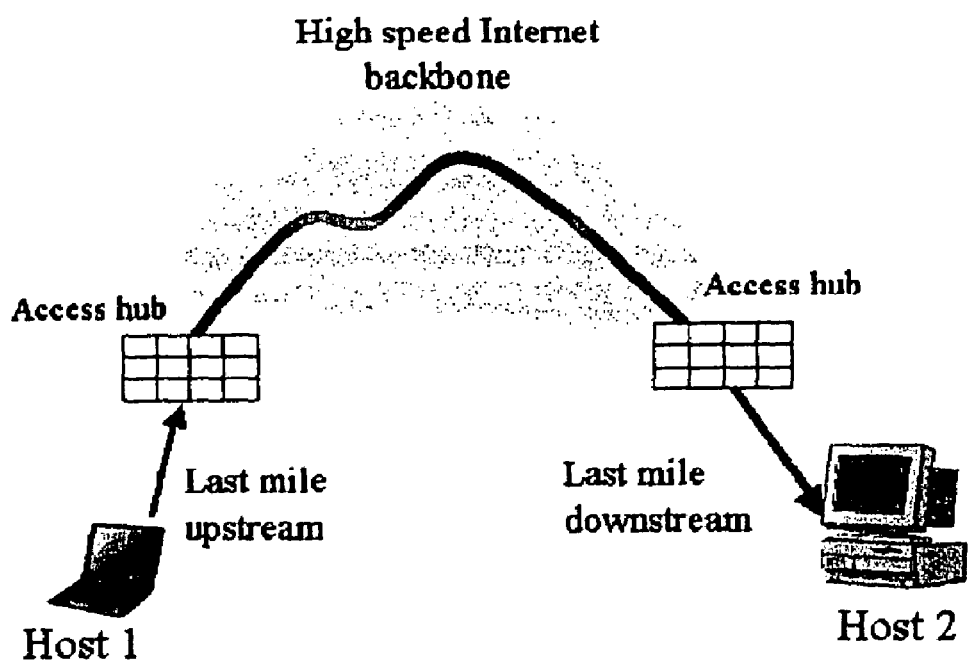
Figure 2. Various components in an end-to-end path

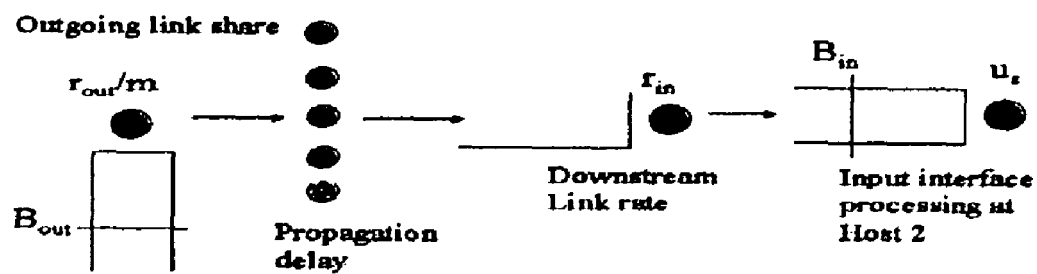
Figure 3. Modeling the end-to-end path

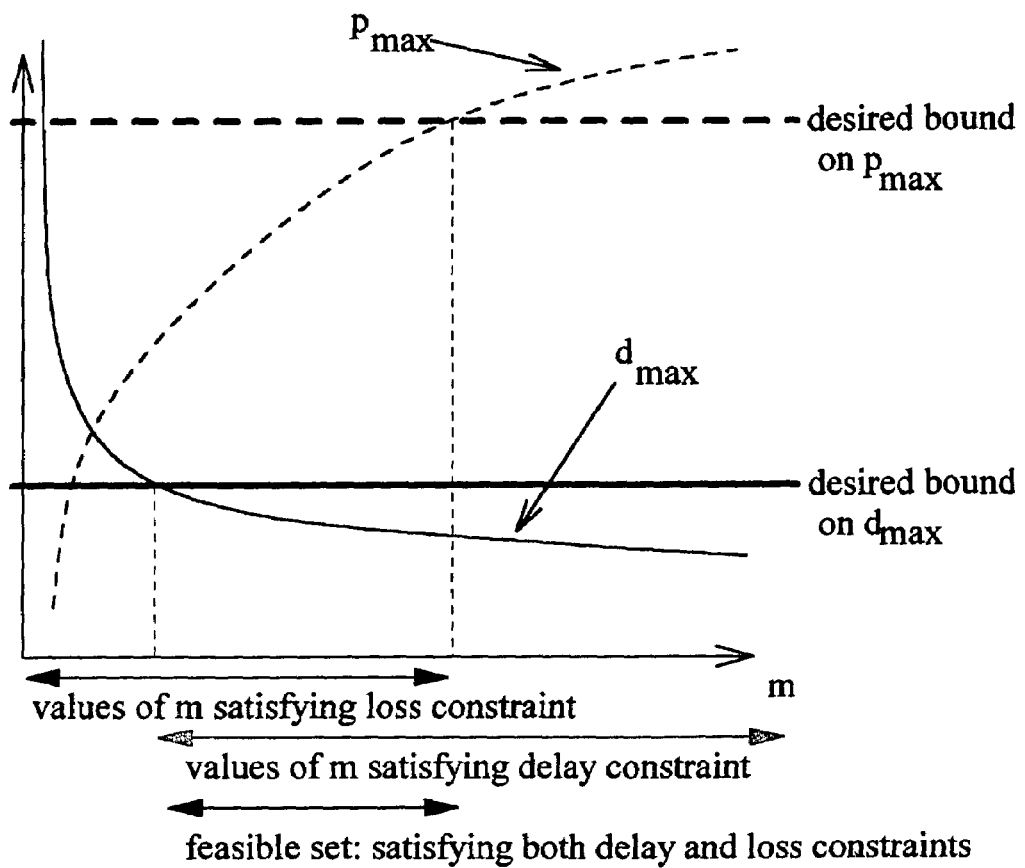
Figure 4: The feasible set for a given load and population N is the intersection of loss feasible and delay feasible regions.

ON-DEMAND GROUP COMMUNICATION SERVICES WITH QUALITY OF SERVICE (QOS) GUARANTEES

FIELD OF THE INVENTION

The present invention generally relates to on-demand group communications supporting quality of service sensitive applications. More specifically, the invention relates to the construction of overlay networks in on-demand group communication.

BACKGROUND OF THE INVENTION

Throughout the instant disclosure, numerals in brackets— [ ]—are keyed to the list of numbered references towards the end of the disclosure.

A growing number of applications are using overlay network support to provide a variety of value added services in the Internet, e.g., CDN (Content Delivery Network) based services, collaborative applications such as video conferencing, instant messaging, secure network services. Typically in an overlay based communication, a forwarding tree is constructed using participating end-system devices and (optionally) forwarding servers to distribute content. This has been advocated as a practical alternative architecture to IP-multicast for supporting large scale group communication. In order to address the performance concerns, there have been efforts to account for limited access link bandwidth at the end-system devices while constructing the forwarding overlay paths.

These efforts, however, do not take into account the "last-mile" problem in terms of the contentions and the asymmetry. Indeed, the supply of Internet backbone bandwidth has kept pace with (and often surpassed) increasing demand, while the "last mile" bandwidth available to residences and small businesses remains a severe limitation. With the advent of WDM (Wavelength Division Multiplexing) technologies, this problem will only become more stringent. Last-mile connections, e.g., cable modems, DSL (digital subscriber line), ISDN (integrated services digital network), and telephone modems, form the bandwidth and latency bottlenecks in connecting the vast majority of home users to the Internet.

End-system multicast networks are especially dependent on last-mile connections, since they require that data traverse these last-mile bottlenecks at each forwarding step. This is especially true of uplink capacity, since even the fastest downstream technologies (DSL and cable modems) have far less upstream capacity. When end-system multicast is deployed, this upstream capacity bottleneck scenario results in significant contention on the bottleneck link, with multiple connections vying for their share of the bandwidth.

End-system multicast relies on forwarding nodes, which receive data, replicate it, and transmit it to multiple receivers. This requires several times more upstream bandwidth than downstream, further exaggerating the already asymmetric nature of many last-mile links. As a result, packets may arrive at an end system much faster than it is capable of forwarding the replicated copies, causing them to queue up in the operating system and/or network interface buffers.

Several efforts have proposed algorithms for the construction of overlays optimized for simple end-to-end delay and bandwidth metrics. Various efforts [1], [2], [3] address the construction of overlays to bound the delay while maximizing the bandwidth. In order to address the QoS concerns, there have been efforts [4], [5], [2], [3] to account for limited access link bandwidth at the end-system devices while constructing the forwarding overlay paths. Various graph theoretic algorithms [1], [2], [3] have been proposed to bound the end-to-end delay while accounting for bandwidth limitations at each forwarding node. The efforts that have focused on QoS based overlay design have either focused on delay or bandwidth as the service requirement.

There are many applications, however, that are elastic in that they can tolerate some amount of loss as well as delay. Chu et al. [6] is one of the first efforts to propose overlay network based mechanisms for supporting collaborative video conferencing applications accounting for both bandwidth and delay requirements. Adapting their previous efforts [1], Chu et al. proposes an algorithm for constructing an overlay tree that assigns priority to bandwidth requirements over the delay requirements in the construction of the overlay forwarding tree. [6] proposes overlay construction among a set of forwarding servers in a two-tier architecture for minimizing the average delay. [4], [5], [7], [2] are steps in the direction that propose intelligent overlay construction accounting for application requirements. These efforts, however, do not explicitly account for the queuing delays caused by contention for last mile bandwidth bottlenecks and sharing of this last mile with link asymmetry. These issues influence the outcome of the constructed overlay as the available bandwidth for each forwarding link is dependent on the node forwarding fanout.

In view of the foregoing, a need has been recognized in connection with overcoming the shortcomings and disadvantages presented by conventional arrangements.

SUMMARY OF THE INVENTION

The present invention broadly contemplates addressing QoS concerns in overlay design to account for the last mile problem. In accordance with the present invention, a simple queuing network model for bandwidth usage in the last-mile bottlenecks is used to capture the effects of the asymmetry, the contention for bandwidth on the outgoing link, to provide characterization of network throughput and latency. Using this characterization computationally inexpensive heuristics are preferably used for organizing end-systems into a multicast overlay which meets specified latency and packet loss bounds, given a specific packet arrival process.

In summary, one aspect of the invention provides a method for constructing an overlay network for use in on-demand group communication, said method comprising the steps of: formulating an overlay tree with at least one node; selecting a forwarding degree for each node in the overlay tree; and selecting a position for each node in the overlay tree.

Another aspect of the invention provides an apparatus for constructing an overlay network for use in on-demand group communication, said apparatus comprising: an arrangement for formulating an overlay tree with at least one node; an arrangement for formulating a forwarding degree for each node in the overlay tree; and an arrangement for selecting a position for each node in the overlay tree.

Furthermore, an additional aspect of the invention provides a program storage device readable by machine, tangibly embodying a program of instructions executable by the machine to perform method steps for constructing an overlay network for use in on-demand group communication, said method comprising the steps of: formulating an overlay tree with at least one node; selecting a forwarding degree for each node in the overlay tree; and selecting a position for each node in the overlay tree.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 is an overlay architecture illustration.
FIG. 2 is a schematic illustration of various components in an end-to-end path.
FIG. 3 is a schematic illustration of a queuing model.
FIG. 4 graphically depicts the feasible set for a given load and where the feasible set is the intersection of loss feasible and delay feasible regions.

DESCRIPTION OF THE PREFERRED EMBODIMENTS

The overlay construction process is preferably addressed in two phases in accordance with the present invention. The first is the selection of a "forwarding degree" (the number of receivers to which an end-system should forward incoming data) for each end-system that will forward data (many nodes will only receive data, and thus have a forwarding degree of zero). This selection has direct implications for the queuing and propagation delays and the packet loss. On one extreme, a chain topology (where each node forwards to one other) minimizes link stress (and therefore queuing latency/loss) but maximizes network transit latency. On the other extreme, a star configuration (where a single node forwards to all others) would minimize network latency at the expense of increasing link stress (and queuing loss). The second phase of overlay construction is the selection of the position (i.e. the parent) of each node in the overlay tree. This problem is NP (nondeterministic polynomial time)-hard in the general setting, where the delay between two nodes and the last mile capacity are uncorrelated, but the last-mile bottleneck scenario (with relatively abundant backbone bandwidth) suggests that greedy ordering according to last-mile bandwidth is a reasonable solution, since delays on the last-mile links dominate the end-to-end latency measurement.

In accordance with the present invention, an overlay network is represented as a queuing network with nodes representing the end system devices and links representing logical (application level) links between nodes. Using techniques from queuing theory or from simulations of queuing networks, the end-to-end performance metrics can be obtained as a function of different network parameters such as arrival rate of data, capacity of overlay links, buffer sizes, etc. This can then preferably be utilized to find feasible values of forwarding degrees (no. of children) of each node in the overlay such that a desired bound on end-to-end performance measure (e.g., loss, delay) is satisfied or some cost function (of performance measures) is minimized. Details of how a queuing network can be abstracted from an overlay and analyzed to obtain feasible values of forwarding degrees for an example scenario will be described below.

The present invention can preferably be used as a building block for constructing efficient heuristics for constructing overlay networks satisfying some performance measures. How the approach of the present invention can preferably be used in different preferred scenarios will now be described.

1. Homogeneous Case: In the homogeneous case, the last-mile bandwidth and latency is the same for all the nodes. In this homogeneous case, there is no important distinction between any of the nodes (the relative abundance of backbone bandwidth means that distances between the nodes is insignificant). The overlay construction problem reduces to selecting the degree of a regular tree (where each forwarding node has the same forwarding degree) such that both the maximum delay and packet loss rate are within specified bounds. Using the queuing network model for the overlay, it is preferred to derive explicit expressions for the worst case loss and delay as a function of the network size and chosen forwarding degree using a buffered node model, and closed-form expressions for a bufferless node model. The analytical expressions for loss and delay provides a feasible set of forwarding degrees for each node in a homogeneous network that result in an overlay tree satisfying given loss and delay constraints. These explicit expressions also provide structural insights into the relationship between delay, loss, and size, and thus the design of overlay construction algorithms for heterogeneous case. For instance, it is observed that by allowing a minimal end-to-end loss rate, it is possible to dramatically increase the number of end-systems supported by an overlay with fixed resource limitations. Neglecting queuing delays when choosing overlay network topologies may result in significant violations of the desired end-to-end delay bounds.

2. Heterogeneous Case: In the heterogeneous case, the access link bandwidths of the end-system nodes are not uniform. The present invention provides a computationally inexpensive heuristic solution based on the formulation for the homogeneous case. The formation of overlays among nodes is simulated with a realistic distribution of bottleneck bandwidths, and it is verified that these overlays meet the desired latency and loss bounds.

It is a goal of the present invention to construct an overlay tree that will deliver packets within stated packet loss and latency bounds, given a set of end-systems (constrained by last-mile bottlenecks) and an expected packet arrival process. Some end-systems will operate as forwarders, by sending a copy of each packet received to some set of other end-systems. Insufficient end-system forwarding capacities may make it infeasible to construct such an overlay, in which case an algorithm for the (minimal) use of auxiliary forwarding nodes, like the one proposed in [3], can be suitably tailored using the ideas from the invention.

FIG. 1 illustrates an application scenario for such an overlay network. A live video broadcast stream is forwarded across the Internet to a set of users with network connectivity ranging from broadband down to a cell phone. The set of participating users and dedicated forwarding nodes (as needed) would form an overlay to deliver the expected data stream within the specified maximum delay and loss constraints. In this case, a loss-resilient video encoding scheme would allow for a certain level of packet loss without significantly degrading the video quality. Other applications may require reliable delivery, in which case an acceptable loss rate of zero may be specified, an ACK/NACK scheme may retransmit lost packets, or a coding mechanism such as FEC (Forward Error Correcting) or LT coding [8] may be used to correct for losses.

A majority of the Internet hosts are connected to the Internet via DSL, cable, or dialup modem. Given the abundance of bandwidth elsewhere in the Internet, the bottleneck on the path between any two hosts is likely to be this "last mile" access link. Outgoing bandwidth across the last-mile link must be shared by all simultaneous outgoing connections, several of which will be necessary to do end-system forwarding in a tree. Asymmetry of last-mile links further increases the stress on the outgoing last-mile link: since DSL and cable modems have several times more downstream than upstream bandwidth, they can receive packets far faster than they can forward them along. Taken together, these factors make it very likely that the performance of an end-system multicast tree will be dominated by the outgoing bandwidth of last-mile link, and that packets will queue in the OS (Operating System) and network interface hardware buffers at forwarding nodes.

FIG. 2 illustrates the various components involved in the forwarding of data from one host to another using overlay network. First host 1 (200) sends data to its output interface, which is transmitted to the DSL/Cable/Dialup/access hub (210) using the uplink (205). The DSL/Cable/Dialup/access hub (210) forwards to the other end over the high speed Internet (215) that is received at host 2's DSL/Cable/dialup/access hub (220). This data is then forwarded to host 2 (240) on its "last mile" downstream link (230).

FIG. 3 depicts a queuing model in accordance with the present invention used to capture these components in forwarding. The first queue (300) represents the forwarding over the upstream link that is shared across all the data forwarding from host 1 to its children nodes. Thus the service rate available for forwarding data to one host (in this case host 2) is approximated as r_out/m, where m is the forwarding degree of host 1. It is preferably assumed that a B_out amount of buffer is allocated for buffering data in the kernel/device for forwarding data on this stream. The next service station (310) with infinite server model accounts for the propagation delay from one access hub to the other end of the access hub over the Internet. There is no queuing and loss at this station as the Internet is order of magnitude faster compared to the last mile. Next queue (320) with service rate r_in represents the forwarding from access hub to the host 2 over the downstream last mile link. The queue 330 in host 2 represents the processing overhead with service rate u_s and buffer capacity B_in at the input interface of host 2.

Given that the processing overhead is much smaller compared to the forwarding rate on the outgoing interface, each node is preferably represented with a single queue with a buffer size B, where B=B_in+B_out with the processing rate r_out/m. Also the propagation delay between two access hubs via the Internet is approximated as the hop count. This measure is justified if the propagation delay is approximately the same along all the paths. In cases where the long distance transit latency becomes significant portion of the end-to-end latency, and differ significantly across various paths, it is assumed that nodes are divided into geographical clusters. In this case, it is assumed that overlays are constructed on a per cluster basis and the connections between the clusters be modeled separately. With such an approach, the propagation delay between any two hosts is taken as hop delay.

The homogeneous case will now be considered. It is assumed that the maximum end-to-end loss rate and delay have been specified and the constructed overlay should meet both these bounds simultaneously. Thus the problem is then to construct a forwarding tree such that its maximum path loss and maximum end-to-end delay (from source node to all the other nodes) are both bounded by the specified limits.

It is preferred the following approach be taken to reduce the above problem into a single parameter problem: note that the loss at a node is a function of the forwarding degree for a given service capacity and arrival rate. The loss rate is derived on the path from the source to the farthest node in the tree to compute the maximum loss among all the paths. Thus maximum loss is a function of number of nodes in the tree and forwarding degree m at each node, i.e, p(m,N). Similarly, the delay on the path between the source and the farthest node from the source is a function of nodes in the tree and forwarding degree at each node, d(m,N). Thus this problem may be stated as: determine m=m_0 such that both the above equations meet the following constraints: p(m,N)<β and d(m,N)<Δ

It is possible that there are multiple solutions to the above constraints. The set of all such m_0 is defined as the feasible set of forwarding degrees. Different loss model approximations (from queuing theory) are considered to obtain expressions for p(m,N) and d(m,N)_and hence the feasible set.

Loss and delay expressions for the homogeneous case will now be given. First some notations are defined:
 r=outgoing rate from each node
 a=arrival rate of packets of the application at the root node of the tree
 B=buffer size at each node
 s=mean size of a packet
 d=depth of the tree
 $d_{max}$=maximum end-to-end delay
 m=forwarding degree of a node in the tree
 N=number of nodes (end users) making the tree
 $p_{max}$ (m, d)=maximum end-to-end loss probability as a function of m and d
 $p_{max}$ (m, N)=maximum end-to-end loss probability tree as a function of m and N Loss and delay expressions for the case when B=0, bufferless case will first be provided. Though the bufferless case is not practical it can be used to provide guidelines for the practical case with finite buffer sizes. By an approximate analysis of this queuing network we get the following expressions:

$$p_{\max}(m, d) = \frac{1}{\frac{r}{mas(d+1)} + 1} \quad (1)$$

Also if N is such that the tree is complete (all the node except the leaf nodes have exactly m children) then the depth of the tree can be written as:

$$d = \frac{\ln(N(m-1)+1)}{\ln m} - 1 \quad (2)$$

The depth of the tree is a good approximation for the (normalized) end-to-end delay for the case when queuing delays are negligible component of the total delay (i.e., when the aggregate delay is dominated by propagation delay) and when the propagation delay on different logical paths connecting any two node are roughly the same. Thus $d_{max} \approx d$.

For example, if one hop represents a delay of 10 ms then the end-to-end delay can be approximated by d×10 ms.

From Equations (1) and (2) $p_{max}$ (m,N) can be written as:

$$p_{\max}(m, N) = \frac{1}{\frac{r \ln m}{mas(\ln(N(m-1)))} + 1} \quad (3)$$

For the scenario where queuing delay is also significant and cannot be neglected, each node can be represented with finite buffer queues. By doing some approximate analysis of this network of finite buffer queues expressions for the end-to-end loss probability and the end-to-end delay (which includes queuing delays also) can be written.

From (2) and (3) the loss and delay as a function of m for a given N can be plotted. As shown in FIG. 4, the feasible set of the values of f satisfying both the loss and delay bounds (β and Δ respectively) can be easily obtained.

The disclosure will now turn to a discussion of the heterogeneous case with nodes of different bandwidths. In most of the practical scenarios, different end systems have different access links (bandwidth) and hence we have a heterogeneous setting. In accordance with the present invention, an "engineering approach" is preferably used for constructing overlay for this case. As seen before, in the homogeneous setting, the problem of constructing an overlay was boiled down to the problem of finding the set of feasible values of forwarding degree, m, for each node and since it was a homogeneous setting all nodes have the same forwarding degree. In the heterogeneous setting, the overlay tree construction requires to determine the forwarding degree (which may be different for each node) and the position of each node in the tree.

More formally, the N heterogeneous nodes are preferably indexed in the decreasing order of their bandwidths. Thus if $r\_i$ is the bandwidth of the i-th node and $r\_i+1$ is the bandwidth of the i+1-th node then $r\_i > r\_i+1$, $i=1, \ldots, N-1$. The problem is to form a tree which satisfies both the delay and the loss requirements i.e., $\Delta$ and $\beta$ respectively. Thus the following two questions need to be answered:

What should be the relative position of the i-th node in the overlay tree?

What should be the forwarding degree $m\_i$ of the i-th node?

The disclosure now turns to a discussion of the preferred heuristics for the heterogeneous case. The basic idea is to determine a representative rate, R, for the give set of bandwidths $r\_1, r\_2, \ldots, r\_N$ and using R construct a (virtual) homogeneous setting with the same number of nodes but where each of the N nodes have the same bandwidth R. The analysis of this homogeneous tree provides the main ingredient for constructing the overlay tree in the heterogeneous setting. The presently preferred heuristics are as follows:

1. Index the nodes in the decreasing order of their bandwidths. Thus if $r\_i$ is the bandwidth of the ith node and $r\_i+1$ is the bandwidth of the i+1th node then $r\_i > r\_i+1$, $i=1, \ldots, N-1$.

2. Determine a representative rate, R, for the given set of bandwidths $r\_1, r\_2, \ldots, r\_N$ (e.g., R can be the median rate).

3. Virtual Homogeneous Tree (VHT) construction: Construct a (virtual) homogeneous tree of N nodes where each node has bandwidth R. Let $p\_VHT(i)$ denote the loss probability for any node at depth i in VHT. Compute the feasible set of forwarding degrees in the homogeneous setting using the approach mentioned earlier for homogeneous case in Section D. From the feasible set, choose that value of forwarding degree that minimizes the loss while meeting the delay constraint.

4. Relative ordering of nodes in the heterogeneous tree: start making the tree with the node with the highest bandwidth $r\_1$ and the next node to join the tree shall be $r\_2$ and so on. Thus a node with higher bandwidth joins the tree before a node with a lesser bandwidth. In situations where two or more nodes have the same bandwidth randomly pick any one of them.

5. Construction of the overlay tree:

(1) Start with node i=1 with bandwidth $r\_1$.

(2) Determine the forwarding degree, $m\_i$ of the node such that the loss probability at this node is equal to $p\_VHT(i)$.

(3) Choose the next $m\_i$ nodes (i.e., nodes with bandwidths $r\_(i+1), \ldots, r\_(i+m\_i)$ and make them children of node i.

(4) Repeat steps (2) and (3) for $i=2, \ldots N$.

(5) Stop when all the nodes are included

The presently preferred heuristic constructs a tree which is experimentally observed to satisfy loss bound and delay bound It is to be understood that the present invention, in accordance with at least one presently preferred embodiment, includes an arrangement for formulating an overlay tree with at least one node; an arrangement for formulating a forwarding degree for each node in the overlay tree; and an arrangement for selecting a position for each node in the overlay tree. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

REFERENCES

[1] Y.-H. Chu, S. G. Rao, and H. Zhang, A Case for End System Multicast, in Proc. of ACM Sigmetrics, June 2000.

[2] S. Shi and J. S. Turner, Multicast Routing and Bandwidth Dimensioning in Overlay Networks, IEEE Journal on Selected Areas in Communication, 2002.

[3] N. Malouch, Z. Liu, D. Rubenstein, S. Sahu, A Graph Theoretic Approach to Bounding Delay in Proxy-Assisted End-System Multicast, in Proc. of Tenth International Workshop on Quality of Service (IWQoS 2002).

[4] Y. Chawathe, S. McCanne, and E. A. Brewer, RMX: Reliable Multicast for Heterogenous Networks, Proceedings of IEEE Infocom, 2000.

[5] Y. Chu, S. Rao, S. Sheshan, H. Zhang, Enabling Conferencing Applications on the Internet Using an Overlay Multicast Architecture, in Proc. of ACM Sigcomm, August 2001

[6] S. Banerjee, C. Kommareddy, K. Kar, B. Bhattacharjee, S. Khuller; Construction of an Efficient Overlay Multicast Infrastructure for Real-Time Applications, in Proc. of IEEE Infocom 2003.

[7] J. Liebeherr, M. Nahas, Application-Layer Multicast with Delaunay Triangulations, IEEE Journal on Selected Areas in Communication, 2003.

[8] M. Luby, Information Additive Code Generator and Decoder for Communication Systems. U.S. Pat. No. 6,373, 406, Apr. 16, 2002.

What is claimed is:

1. A method for constructing an overlay network for use in on-demand group communication, said method comprising the steps of:

formulating an overlay tree with at least one node, wherein the overlay tree is preferably constructed to provide for delivery of at least one packet within a predetermined packet-loss bound and latency bound for a predetermined set of end-system nodes and an expected packet arrival process;

selecting a forwarding degree for each end-system node that will forward data in the overlay tree, wherein the forwarding degree is the number of receivers to which the end-system should forward incoming data;

selecting a position for each node in the overlay tree, wherein each node is in the position of greedy ordering according to a last-mile bandwidth since delays on the last-mile link dominate an end-to-end performance measure; and determining the forwarding degree such that a desired bound on the end-to-end performance measure is satisfied, wherein thee end-to-end performance measure can be obtained as a function of different network parameters consisting of: arrival rate of data, capacity of overlay links, and buffer sizes.

2. The method according to claim 1, wherein the overlay tree is represented as a queuing network.

3. The method according to claim 2, wherein each node represents an end system and links between nodes represent logical links.

4. The method according to claim 3, wherein the logical link is an application level link.

5. The method according to claim 1, wherein the forwarding degree is determined such that a desired bound on end-to-end performance measure is satisfied.

6. The method according to claim 1, wherein the forwarding degree is determined such that a cost function of performance measure is minimized.

7. The method according to claim 1, wherein the overlay tree is constructed using heuristics.

8. An apparatus for constructing an overlay network for use in on-demand group communication, said apparatus comprising:

an arrangement for formulating an overlay tree with at least one node, wherein the overlay tree is preferably constructed to provide for delivery of at least one packet within a predetermined packet-loss bound and latency bound for a predetermined set of end-system nodes and an expected packet arrival process;

an arrangement for selecting a forwarding degree for each end-system node that will forward data in the overlay tree, wherein the forwarding degree is the number of receivers to which the end-system should forward incoming data;

an arrangement for selecting a position for each node in the overlay tree, wherein each node is in the position of greedy ordering according to a last-mile bandwidth since delays on the last-mile link dominate an end-to-end performance measure; and determining the forwarding degree such that a desired bound on the end-to-end performance measure is satisfied, wherein the end-to-end performance measure can be obtained as a function of different network parameters consisting of: arrival rate of data, capacity of overlay links, and buffer sizes.

9. The apparatus according to claim 8, wherein the overlay tree is represented as a queuing network.

10. The apparatus according to claim 9, wherein each node represents an end system and links between nodes represent logical links.

11. The apparatus according to claim 10, wherein the logical link is an application level link.

12. The apparatus according to claim 8, wherein the forwarding degree is determined such that a desired bound on end-to-end performance measure is satisfied.

13. The apparatus according to claim 8, wherein the forwarding degree is determined such that a cost function of performance measure is minimized.

14. The apparatus according to claim 8, wherein the overlay tree is constructed using heuristics.

15. A computer readable media, tangibly embodying a program of instructions executable by a computer to perform method steps for constructing an overlay network for use in on-demand group communication, said method comprising the steps of:

formulating an overlay tree with at least one node, wherein the overlay tree is preferably constructed to provide for delivery of at least one packet within a predetermined packet-loss bound and latency bound for a predetermined set of end-system nodes and an expected packet arrival process;

selecting a forwarding degree for each end-system node that will forward data in the overlay tree, wherein the forwarding degree is the number of receivers to which the end-system should forward incoming data;

selecting a position for each node in the overlay tree, wherein each node is in the position of greedy ordering according to a last-mile bandwidth since delays on the last-mile link dominate an end-to-end performance measure; and determining the forwarding degree such that a desired bound on the end-to-end performance measure is satisfied, wherein the end-to-end performance measure can be obtained as a function of different network parameters consisting of: arrival rate of data, capacity of overlay links, and buffer sizes.

* * * * *